Sept. 2, 1958     C. C. JOHNSON     2,850,039

SAFETY VALVE

Filed April 19, 1955

INVENTOR.
CHARLES C. JOHNSON
BY James H. Conner
AGENT

United States Patent Office 2,850,039
Patented Sept. 2, 1958

2,850,039

SAFETY VALVE

Charles C. Johnson, Brooklyn, N. Y.

Application April 19, 1955, Serial No. 502,395

2 Claims. (Cl. 137—517)

This invention relates generally to automatic safety valves and more particularly to an automatic safety valve having a novel valve stem lubricating means.

The present invention is primarily applicable to compressed air systems but, however, may be readily utilized in any gas or liquid piping system. Many prior devices having a similar purpose to the present, i. e., to automatically shut off the flow, whether it be air or liquid should the piping beyond the valve rupture, failed to operate properly as a result of condensation forming on the valve stem and subsequently freezing into ice. The prior art devices were not reliable in low temperature areas since the freezing or immobilization of the valve stem rendered the valve useless. Such a condition is extremely dangerous and in the event of a rupturing of the pipe system utilized with the valve, said valve in its frozen condition does not shut off the supply and obviously cannot perform as a safety valve. Especially in the case of compressed air systems, a rupturing of the air hose or an accidental disconnection of the equipment being operated by the air hose causes the end of the air hose to whip uncontrollably and many serious injuries have resulted from this uncontrolled motion of the hose. With the present invention, valve stem freezing is completely eliminated and the safety shut-off feature of the valve prevails under all conditions and is readily dependable for the safety of the operators.

Furthermore, the present invention also provides for dependable operation of the safety factor even during extremely low temperature conditions. In this instance, an anti-freezing compound may be injected into means provided therefor which prevents condensation from accumulating and freezing into ice on the valve stem. When the present invention is utilized in a liquid piping system, the lubrication feature is unchanged and operates dependably without regard to the temperature of the liquid.

Therefore, one of the principal objects of the invention resides in the provision of an automatic shut-off valve having means to lubricate the valve stem to prevent freezing thereof.

Another object of the invention resides in the provision of a valve of the class described having means to store a lubricant for use in said lubricating means.

Still another object of the invention resides in the provision of a valve of the class described having means to seal the lubricant within the valve and independently of the material flowing through said valve.

Other ancillary objects will be, in part, hereinafter apparent and will be, in part, hereinafter pointed out.

Figure 1:
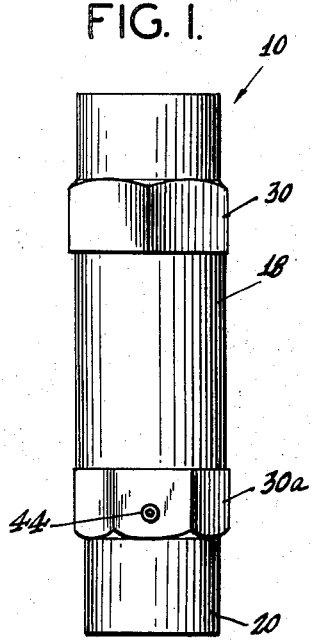
Figure 1 is a plan elevation of the valve housing.
Figure 2:
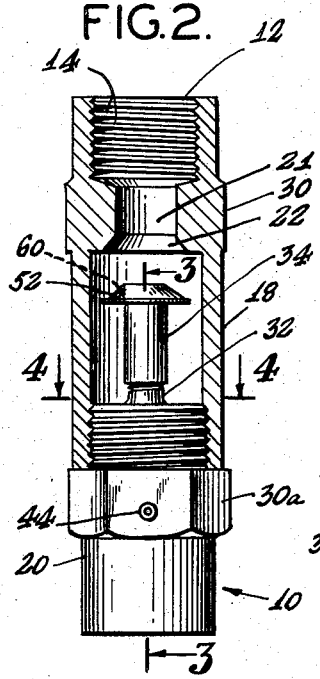
Figure 2 is a plan elevation with a portion of the valve housing cut away and shown in cross section to more fully illustrate the internal components thereof.

Referring to the drawings in detail, 10 generally designates a valve housing which is provided with a bore 12 extending through the housing 10. The internal periphery of the bore 12 is threaded at each end, such as shown at 14 and 16, to receive auxiliary piping therein so that the valve may be included in a piping system. The housing 10 comprises sections 18 and 20. Section 18 has a portion of the bore 12 formed with a reduced internal diameter at 21 and which is further provided with a bevelled edge 22 at one end thereof. Bevelled edge 22 constitutes a valve seat as will be hereinafter described in detail. Housing section 20 is provided with a central web section designated as 24 which extends diametrically across the bore 12 to divide said bore into dual passageways 12a and 12b. The housing section 20 has a portion of the external periphery thereof threaded complementally to a threaded portion of the internal periphery of section 18 and said sections may be joined together in sealed relation thereby. Each of the sections 18 and 20 are provided with a hexagon periphery section designated as 30 and 30a respectively, to facilitate the joining together thereof.

Figure 3:
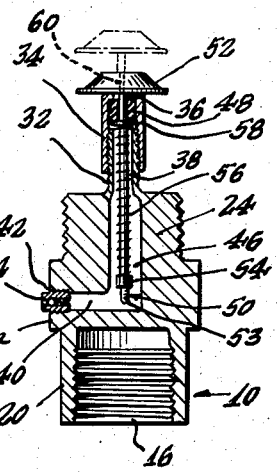
Figure 3 is a cross sectional view taken along line 3—3 of Figure 2.
Figure 4:
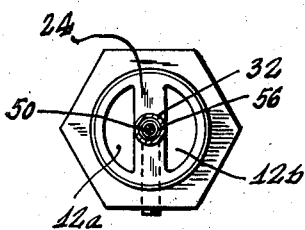
Figure 4 is a cross sectional view taken along line 4—4 of Figure 2.

As shown in Figure 3, the diametrical portion or web 24 is provided with a projection 32 which extends longitudinally therefrom. The projection 32 is provided on its external periphery with threads and adapted to be disposed thereon, is a complementally threaded sleeve 34 having an aperture 36 formed in one end thereof. The projection 32 is further provided with a bore 38 which extends through and into the web portion 24 and communicates with a transverse bore 40. Transverse bore 40 further communicates with an aperture 42 provided in one of the planes of the hexagon periphery 30a. As shown in Figures 1, 2, 3 and 4, a pressure type ball valve 44 may be inserted therein to facilitate the lubrication of the chamber 46 formed by the bore 38. Disposed adjacent to the aperture 36 within the sleeve 34 is a packing compound designated as 48 which is adapted to surround valve stem 50 of the valve 52. As shown in Figure 3, the valve stem 50 is provided with a threaded end portion 53 which has a nut 54 thereon. A coil spring 56 is disposed to abut against a washer 58 at one end thereof and is retained in compressed relation and circumjacently disposed around the valve stem 50 by means of the nut 54. The tension of spring 56 is predetermined and sufficient to compress the packing 48 in a sealing relationship with the valve stem 50. While this sealing relationship prevents material from entering the chamber 46 or any material in the chamber 46 from leaking into the bore 12, the valve 52 and the valve stem 50 is sufficiently free to move longitudinally through packing 48 and the aperture 36 of the sleeve 34 as will be hereinafter described.

When the present invention is employed in a compressed air system, the head of valve 52 is normally disposed in spaced relation from the valve seat 22 thereby permitting air to flow through the bore 12. This condition is normal and exists when a predetermined air pressure is present in the bore 12. The valve condition will not change until the pressure or flow exceeds a predetermined maximum amount. This predetermined maximum amount is determined by the tension of the spring 56. Should equipment, not shown, suddenly be removed from the air line in which the valve 10 is disposed, the increased flow of air and pressure will carry the valve 52 in the direction of flow into engagement with the valve seat 22 and effectively shut off the supply of air passing through the bore 12. The head of valve 52 is provided with a small through aperture 60 which permits a small amount of air to bleed through the valve when the valve is in closed relation with the seat 22. This is provided so that a reconnection of the equipment, not shown, will permit a gradual build up of pressure in the piping externally of the bore 12, until it is substantially equal to the pressure within the bore 12. The spring 56 overcomes the pressure and re-opens the valve 52. The equipment being operated by the air pressure may now continue in a normal manner.

The present invention is particularly adapted for utilization in pressed air systems that are exposed to freezing temperatures. Under the average conditions for temperatures which hover around the freezing mark, the chamber 46 may be filled with a lubricating oil which will surround the valve stem 50 and prevent moisture from accumulating thereon. It is readily apparent that any accumulation of moisture on the valve stem would restrict the normally closing operation thereof and would render the valve useless.

In the instances where such a system is exposed to severe freezing conditions, the chamber 46 may be filled with a lubricant and anti-freezing solution for reasons readily apparent.

Figure 5:
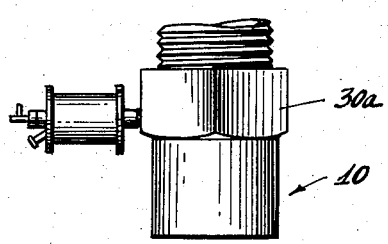
Figure 5 is a fragmentary detail illustrating the attachment of an auxiliary storage means for a reserve supply of lubricant or anti-freezing solution for the valve stem.
Figure 6:
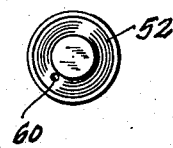
Figure 6 is a plan view of the valve head of the present invention.

The embodiment shown in Figure 5 merely provides a reservoir for a reserve supply of lubrication or anti-freezing solution as the case may be. Such a reservoir would eliminate or would extend the periods during which the valve would require a manual oiling. This embodiment will be preferably included in a fixed system where no flexible piping is utilized and many branches of piping are supplied by a main source. Each branch may have a valve 10 included therein so that a rupture of any one of the pipes beyond the valve would not disturb the pressure unnecessarily throughout the entire pipe system.

While there has been shown an example in which compressed air is the controlled matter, it will be understood that the present invention will operate in an identical manner with systems which include other gasses or fluids.

Thus, it is readily evident that there has been conceived a device that is efficient and well adapted to meet the conditions of practical use.

Whereas, it is obvious that the several objects of the invention as specifically hereinbefore set forth are achieved, it is understood that numerous changes in construction and rearrangements of the elements may be made without departing from the spirit of the invention as defined by the following claims.

The invention claimed is:

1. An automatic shut off valve, comprising a housing having a through bore and including a valve seat, a valve co-operable with said valve seat and biased normally open, a valve stem supporting said valve, means integrally formed from said housing for supporting said valve stem, a chamber disposed within said supporting means, and surrounding a substantial portion of said stem when said valve is biased open, a fluid lubricant in said chamber covering the substantial portion of the stem therein, resilient means disposed within said chamber for normally biasing said valve open, and means for sealing the fluid lubricant in said chamber.

2. In a valve of the class described, in combination, a member having a longitudinal bore extending therethrough, means disposed adjacent to each end of said bore for securing said member in sealed relation in a piping system, a valve seat within said member affixed to the internal periphery of said bore, a normally disposed open valve co-operating with said valve seat to effectively close said valve when actuated, resilient means normally positioning said valve in biased open relation away from the valve seat, a valve stem supporting said valve disposed within said resilient means, a lubricant surrounding said valve stem and said resilient means, and lubricant retaining means surrounding said lubricant, said lubricant retaining means comprising a chamber sealed to prevent the entry of the material flowing in said bore.

References Cited in the file of this patent

UNITED STATES PATENTS

| | | |
|---|---|---|
| 942,972 | Palmer | Dec. 14, 1909 |
| 1,446,659 | Pelletier | Feb. 27, 1923 |
| 1,956,010 | Diescher | Apr. 24, 1934 |
| 2,100,862 | Lofton | Nov. 30, 1937 |
| 2,354,161 | Waterman | July 18, 1944 |
| 2,602,631 | Eickmeyer | July 8, 1952 |

FOREIGN PATENTS

| | | |
|---|---|---|
| 127,374 | Sweden | 1950 |